(12) United States Patent
Jia et al.

(10) Patent No.: US 9,426,236 B2
(45) Date of Patent: Aug. 23, 2016

(54) DETERMINING A LOCATION AND AREA OF A PLACE BASED ON DISTANCES BETWEEN THE FIRST MEAN AND CHECK IN LOCATIONS

(75) Inventors: Yuntao Jia, Palo Alto, CA (US); Mukund Narasimhan, Bellevue, WA (US); Jonathan Chang, San Francisco, CA (US); Joshua Redstone, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 204 days.

(21) Appl. No.: 13/545,229

(22) Filed: Jul. 10, 2012

(65) Prior Publication Data

US 2014/0019532 A1   Jan. 16, 2014

(51) Int. Cl.
*H04L 29/08* (2006.01)
*G06Q 50/00* (2012.01)

(52) U.S. Cl.
CPC ............. *H04L 67/22* (2013.01); *G06Q 50/01* (2013.01); *H04L 67/18* (2013.01)

(58) Field of Classification Search
CPC ........ H04L 67/22; H04L 29/06; G06Q 10/10
USPC ....................................................... 709/204
See application file for complete search history.

(56) References Cited

U.S. PATENT DOCUMENTS

| | | | |
|---|---|---|---|
| 7,286,814 B2* | 10/2007 | Watanabe | H04W 60/00 455/404.2 |
| 7,606,936 B2* | 10/2009 | Mousseau | G06Q 10/107 455/436 |
| 7,620,902 B2* | 11/2009 | Manion | G06Q 10/10 709/204 |
| 8,229,458 B2* | 7/2012 | Busch | 455/456.1 |
| 8,346,864 B1* | 1/2013 | Amidon | H04L 65/1069 709/204 |
| 8,370,062 B1* | 2/2013 | Starenky et al. | 701/467 |
| 8,386,514 B2 | 2/2013 | Cheng | |
| 8,589,808 B1* | 11/2013 | Alfaro et al. | 715/753 |
| 8,661,121 B1* | 2/2014 | Mendis | 709/224 |
| 8,750,894 B1* | 6/2014 | Stogaitis et al. | 455/456.1 |
| 2002/0196181 A1* | 12/2002 | Fall | 342/357.06 |
| 2004/0204184 A1 | 10/2004 | Lin | |
| 2006/0064346 A1 | 3/2006 | Steenstra | |
| 2006/0099940 A1* | 5/2006 | Pfleging et al. | 455/419 |
| 2007/0005419 A1* | 1/2007 | Horvitz et al. | 705/14 |
| 2007/0161382 A1* | 7/2007 | Melinger | H04L 67/18 455/456.1 |
| 2008/0070593 A1* | 3/2008 | Altman et al. | 455/457 |

(Continued)

FOREIGN PATENT DOCUMENTS

| EP | 1441235 A2 | 7/2004 |
|---|---|---|
| EP | 1903815 A2 | 3/2008 |

(Continued)

OTHER PUBLICATIONS

Notice of Appeal and Pre-Appeal Brief Request for Review, U.S. Appl. No. 13/417,013, ( 6 pgs), Oct. 31, 2013.

(Continued)

*Primary Examiner* — Razu A Miah
(74) *Attorney, Agent, or Firm* — Baker Botts L.L.P.

(57) ABSTRACT

In one embodiment, a method includes calculating a first mean of check-in locations associated with a place; selecting a subset of the check-in locations based on distances between the first mean and the check-in locations; and determining a central location and at least a portion of a perimeter of the place based on the subset of the check-in locations.

23 Claims, 3 Drawing Sheets

(56) References Cited

U.S. PATENT DOCUMENTS

| | | | |
|---|---|---|---|
| 2008/0195457 A1* | 8/2008 | Sherman et al. | 705/10 |
| 2008/0214210 A1* | 9/2008 | Rasanen et al. | 455/456.3 |
| 2009/0098880 A1* | 4/2009 | Lindquist | 455/456.1 |
| 2009/0163226 A1 | 6/2009 | Karkaria | |
| 2009/0164120 A1 | 6/2009 | Boore | |
| 2009/0164574 A1* | 6/2009 | Hoffman | 709/204 |
| 2009/0164577 A1* | 6/2009 | Parkes et al. | 709/204 |
| 2009/0171779 A1* | 7/2009 | Shrivathsan et al. | 705/14 |
| 2009/0312032 A1 | 12/2009 | Bornstein | |
| 2009/0327227 A1* | 12/2009 | Chakra et al. | 707/3 |
| 2010/0081436 A1 | 4/2010 | Kubo | |
| 2010/0130213 A1 | 5/2010 | Vendrow et al. | |
| 2010/0198690 A1* | 8/2010 | Gilvar | G01S 5/0221 705/14.58 |
| 2010/0232329 A1 | 9/2010 | Park | |
| 2010/0238070 A1* | 9/2010 | Harper et al. | 342/357.46 |
| 2010/0323723 A1* | 12/2010 | Gerstenberger et al. | 455/456.5 |
| 2011/0010422 A1* | 1/2011 | Bezancon et al. | 709/204 |
| 2011/0019587 A1* | 1/2011 | Wang | H04L 63/08 370/254 |
| 2011/0142016 A1 | 6/2011 | Chatterjee | |
| 2011/0238755 A1* | 9/2011 | Khan et al. | 709/204 |
| 2011/0250871 A1 | 10/2011 | Huang | |
| 2011/0250875 A1 | 10/2011 | Huang | |
| 2011/0276396 A1* | 11/2011 | Rathod | 705/14.49 |
| 2011/0288917 A1* | 11/2011 | Wanek et al. | 705/14.5 |
| 2012/0079018 A1* | 3/2012 | Rottler et al. | 709/204 |
| 2012/0084151 A1* | 4/2012 | Kozak et al. | 705/14.58 |
| 2012/0287031 A1 | 11/2012 | Valko | |
| 2012/0304087 A1* | 11/2012 | Walkin et al. | 715/764 |
| 2012/0309413 A1* | 12/2012 | Grosman et al. | 455/456.1 |
| 2012/0317615 A1 | 12/2012 | Geva et al. | |
| 2013/0018714 A1* | 1/2013 | George | 705/14.16 |
| 2013/0316735 A1* | 11/2013 | Li et al. | 455/456.3 |

FOREIGN PATENT DOCUMENTS

| | | |
|---|---|---|
| JP | 2005-086579 A | 3/2005 |
| JP | 2005-196758 A | 7/2005 |
| JP | 2010-081456 | 4/2010 |
| JP | 2010-534858 A | 11/2010 |
| JP | 2013-538472 A | 10/2013 |
| KR | 10-2006-0065339 | 6/2006 |
| WO | WO 02/31441 A1 | 4/2002 |
| WO | 2010-047849 A1 | 4/2010 |
| WO | WO 2011/156789 | 12/2011 |

OTHER PUBLICATIONS

Appeal Brief, U.S. Appl. No. 13/417,013, (13 pgs), Dec. 30, 2013.
Response Pursuant to C.F.R. § 1.111 for U.S. Appl. No. 13/431,842 to Papakipos, et al., ( 8 pgs), Dec. 17, 2013.
Office Action for U.S. Appl. No. 13/417,013, Feb. 20, 2013.
International Search Report and Written Opinion for PCT/US2013/028963, Jun. 12, 2013.
Reponse to Office Action for U.S. Appl. No. 13/417,013 to Papakipos, et al., 8 pages, Jul. 22, 2013.
USPTO Final Office Action for U.S. Appl. No. 13/417,013 to Papakipos, et al., 18 pages, Jul. 31, 2013.
Reponse to Office Action for U.S. Appl. No. 13/417,013 to Papakipos et al., 8 pages, Sep. 30, 2013.
USPTO Final Office Action for U.S. Appl. No. 13/431,842 to Papakipos, et al., 11 pages, Sep. 17, 2013.
USPTO, Office Action, U.S. Appl. No. 13/416,975, filed Mar. 9, 2012, in re: Matthew Nicholas Papakipos; (13 pgs).
U.S. Appl. No. 13/416,975, filed Mar. 9, 2012, Papakipos.
U.S. Appl. No. 13/417,013, filed Mar. 9, 2012, Papakipos.
U.S. Appl. No. 13/431,842, filed Mar. 27, 2012, Papakipos.
USPTO, Office Action, U.S. Appl. No. 13/416,975, filed date Mar. 9, 2012, in re: Matthew Nicholas Papakipos; (13 pgs).
IL Office Action from Patent Authority of the State of Israel Ministry of Justice for Israeli Patent Application No. 234414 (with English translation), May 11, 2015.
Australian Government Search Information Statement and Patent Examination Report No. 1 for Patent Application 2013230230, Jan. 16, 2015.
Japanese Office Action "Notification of Reasons for Rejection" for JP Application No. JP 2014-561007 (with English translation), Feb. 3, 2015.
KR Office Action "Notice of Preliminary Rejection" of the Korean Intellectual Property Office for Application No. 10-2014-7028226 (with English translation), Mar. 4, 2015.
CA Communication and Examination Search Report from the Canadian Intellectual Property Office for CA Patent Application No. 2,866,158, May 8, 2015.
European Search Report for EP Patent Application No. 13757856.3 from European Patent Office, Jul. 10, 2015.
Notice of Defects received from the State of Israel Patent Authority for Israeli Patent Application No. 234414, Mar. 17, 2016.
Japanese Office Action received from the Japanese Patent Office for Japanese Patent Application No. 2015-142231, May 31, 2016.

* cited by examiner

DETERMINING A LOCATION AND AREA OF A PLACE BASED ON DISTANCES BETWEEN THE FIRST MEAN AND CHECK IN LOCATIONS

TECHNICAL FIELD

This disclosure generally relates to location services.

BACKGROUND

A social-networking system, such as a social-networking website, may enable its users to interact with it and with each other through it. The social-networking system may create and store a record (such as a user profile) associated with the user. The user profile may include demographic information on the user, communication-channel information for the user, and personal interests of the user. The social-networking system may also create and store a record of the user's relationships with other users in the social-networking system (e.g. a social graph), as well as provide social-networking services (e.g. wall-posts, photo-sharing, or instant-messaging) to facilitate social interaction between or among users in the social-networking system.

DESCRIPTION OF EXAMPLE EMBODIMENTS

Figure 1:
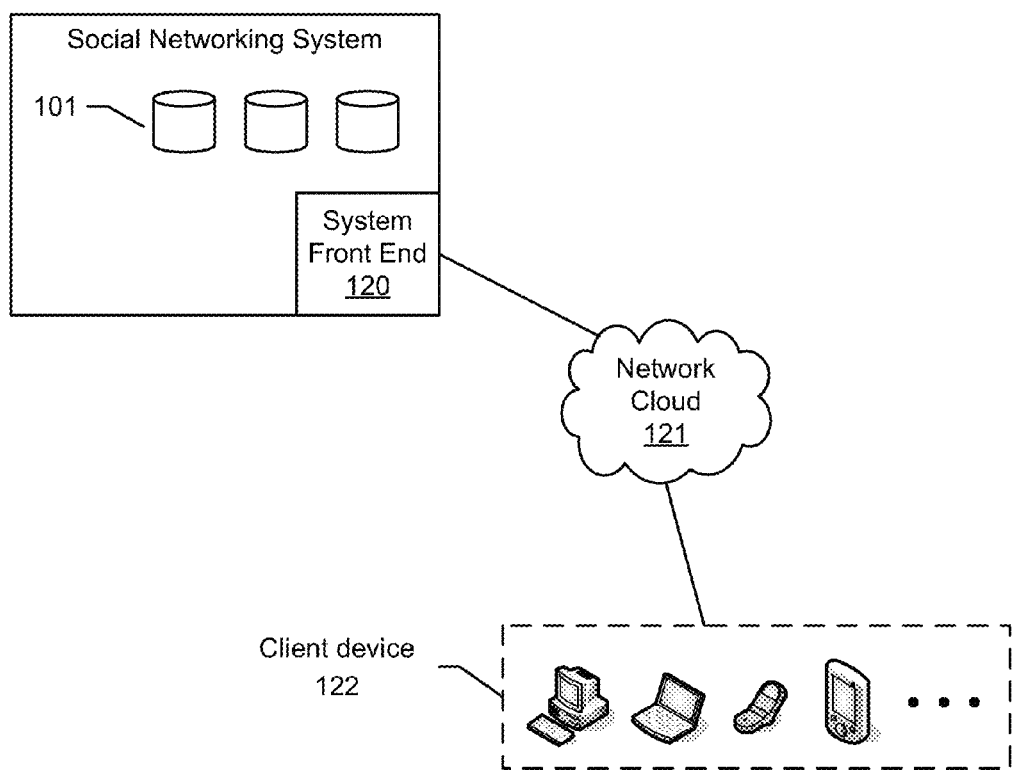
FIG. 1 illustrates an example network environment of a social-networking system.

A social-networking system may store records of users and relationships between users in a social graph comprising a plurality of user nodes, a plurality of concept nodes, and a plurality of edges connecting the nodes. A user node of the social graph may correspond to a user of the social-networking system. A user may be an individual (human user), an entity (e.g. an enterprise, business, or third party application), or a group (e.g. of individuals or entities). A user node corresponding to a user may comprise information provided by the user and information gathered by various system, including the social-networking system. For example, the user may provide his name, profile picture, contact information, birth date, gender, marital status, family status, employment, education background, preferences, interests, and other demographical information to be included in the user node. Each user node of the social graph may correspond to a web page (typically known as a profile page). For example, in response to a request including a user name, the social-networking system can access a user node corresponding to the user name, and construct a profile page including the name, a profile picture, and other information associated with the user. A concept node may correspond to a concept of the social-networking system. For example, a concept can represent a real-world entity, such as a movie, a song, a sports team, a celebrity, a restaurant, or a place or a location. An administrative user of a concept node corresponding to a concept may create the concept node by providing information of the concept (e.g. by filling out an online form), causing the social-networking system to create a concept node comprising information associate with the concept. Each concept node of the social graph may correspond to a web page. For example, in response to a request including a name, the social-networking system can access a concept node corresponding to the name, and construct a web page including the name and other information associated with the concept. An edge between a pair of nodes may represent a relationship between the pair of nodes. For example, an edge between two user nodes can represent a friendship between two users. For example, the social-networking system may construct a web page (or a structured document) of a concept node (e.g. a restaurant, a celebrity), incorporating one or more selectable buttons (e.g. "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g. the user's activity or action related to the concept such as the user checks in a restaurant, or the user likes a celebrity). In addition, the degree of separation between any two nodes is defined as the minimum number of hops required to traverse the social graph from one node to the other. A degree of separation between two nodes can be considered a measure of relatedness between the users or the concepts represented by the two nodes in the social graph.

A social-networking system may support a variety of applications, such as photo sharing, on-line calendars and events, and instant messaging. For example, the social-networking system may also include media sharing capabilities. For example, the social-networking system may allow users to post photographs and other multimedia files to a user's profile page (typically known as wall posts) or in a photo album, both of which may be accessible to other users of the social-networking system. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

A social-networking system may maintain a database of information relating to geographic locations or places. Places may correspond to various physical locations, such as restaurants, bars, train stations, airports, parks, and the like. The social-networking system may maintain a concept node corresponding to a place as described earlier. A concept node corresponding to a place may comprise a name of the place, a location of the place (e.g. a geographical location in longitude and latitude coordinates, a street address, etc.), and other information associated with the place (e.g. photos, business hours, etc.). In response to a user's request including a name or a location transmitted from the user's client device, the social-networking system may access the social graph and construct a web page including one or more places that substantially match the name or the location provided in the user's request. The user may access the web page using a web browser hosted by the user's client device and select a selectable "check in" button incorporated in the web page for a particular place of the one or more places, causing the client device to transmit to the social-networking system a request to create an edge between a user node of the user and a concept node of the particular place, indicating a relationship between the user and the particular place (e.g. the user checks in the particular place). The user may provide a name or a location (e.g. a street address) in the user's request. In addition, an application hosted by the user's client device or a server-side process of the social-networking system may automatically determine the user's location for the request based on a geographic location of the user's client device (e.g. as determined by IP address, cell tower triangulation, Wi-Fi positioning, Global Positioning System or GPS positioning, or any combinations of two or more of those positioning methods). Particular embodiments contemplate any suitable methods for determining a user's location. An edge corresponding to a check-in activity between a user node of a user and a concept node of a place may comprise data including a check-in location, a time stamp, and other related information (e.g. accuracy of GPS coordinates provided by the user's client device).

FIG. 1 illustrates an example network environment of a social-networking system. In particular embodiments, a social-networking system may comprise one or more data stores 101. For example, the social-networking system may store user profile data and social graph information in data stores 101. For example, each data store 101 may comprise one or more storage devices. In particular embodiments, the social-networking system may comprise one or more computing devices (e.g. servers) hosting functionality directed to operation of the social-networking system. In particular embodiments, one or more of data stores 101 may be operably connected to the social-networking system's front end 120. A user of the social-networking system may access the social-networking system using a client device such as client device 122. In particular embodiments, front end 120 may interact with client device 122 through network cloud 121. For example, front end 120 may be implemented in software programs hosted by one or more computing devices of the social-networking system. Front end 120 may include web or HTTP server functionality, as well as other functionality, to allow users to access the social-networking system.

Client device 122 is generally a computer or computing device including functionality for communicating (e.g. remotely) over a network. For example, client device 122 can be desktop computer, a mobile phone, a tablet computer, a laptop computer, a handheld game console, an electronic book reader, in- or out-of-car navigation system, or any other suitable computing devices. Client device 122 may execute one or more client applications, such as a web browser (e.g. Microsoft Windows Internet Explorer, Mozilla Firefox, Apple Safari, Google Chrome, and Opera, etc.) or special-purpose client application (e.g. Microsoft Outlook, Facebook for iPhone, etc.), to access or view content over a computer network.

Network cloud 121 may represent a network or collection of networks (such as the Internet, a corporate intranet, a virtual private network, a local area network, a wireless local area network, a cellular network, a wide area network, a metropolitan area network, or a combination of two or more such networks) over which client devices 122 may access the social network system.

In particular embodiments, the social-networking system may store in data stores 101 data associated with applications and services provided by the social-networking system. For example, the social-networking system may store user event data in data stores 101. A user may register a new event by accessing a client application to define an event name, a time and a location, and cause the newly created event to be stored (e.g. as a concept node) in data stores 101. For example, a user may register with an existing event by accessing a client application to confirming attending the event, and cause the confirmation to be stored in data stores 101. For example, the social-networking system may store the confirmation by creating an edge in a social graph between a user node corresponding to the user and a concept node corresponding to the event, and store the edge in data stores 101.

In particular embodiments, the social-networking system may store location data in data stores 101. For example, a node of a social graph stored in data stores 101 may comprise location data associated with a user or a concept. For example, location data associated with a concept (e.g. a place) can be an address, or a geographic location (e.g. a set of geographic coordinates in latitude and longitude). For example, location data associated with a user can be an address, or a geographic location of the user's client device as described earlier. For example, location data associated with a user can be a location of a concept related to the user (e.g. as determined by a edge between a user node of the user and a concept node of the concept). For example, a user's location can be a location of an event that the user is attending. For example, a user's location can be a location of a place that the user just checks in to.

Location data of a place may comprise a plurality of geographic location data points. For example, location data of a place may comprise geographic locations corresponding to check-in locations of a plurality of users. Meanwhile, it is desirable to determine a single location and an area (or perimeter) that can be representative of a place. Particular embodiments describe methods of determining a location and a perimeter of a place by utilizing check-in location data associated with the place.

Figure 2:
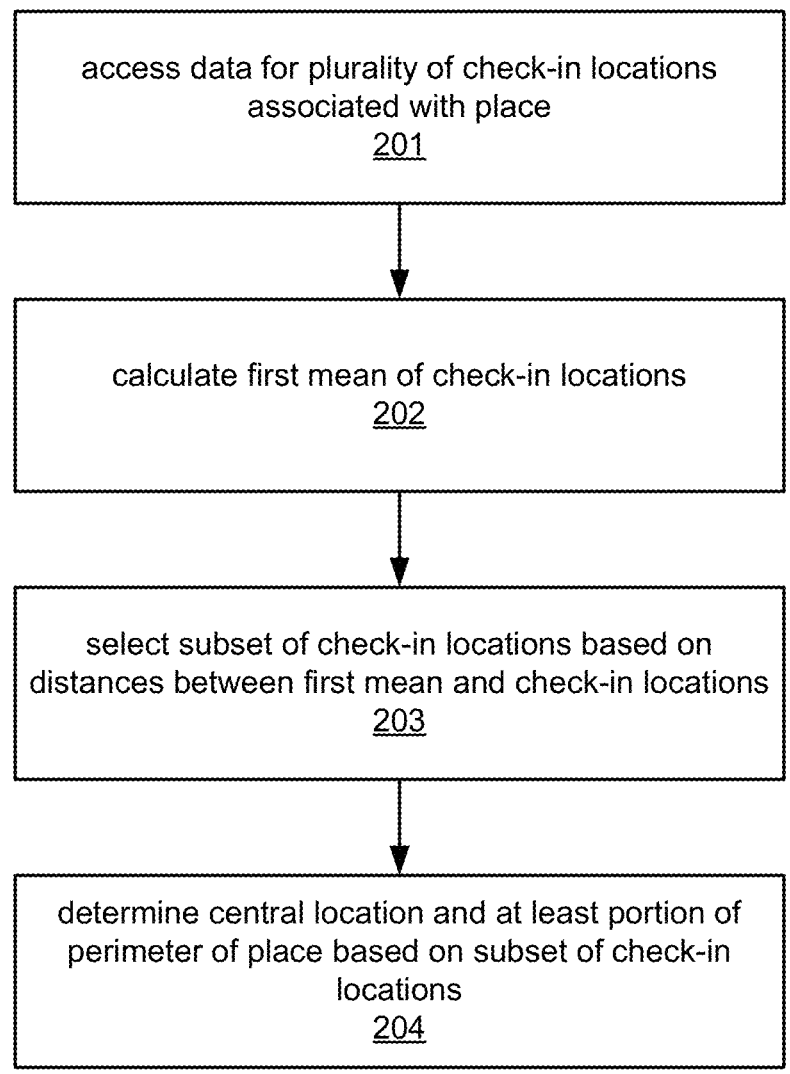
FIG. 2 illustrates an example method of determining a location and a perimeter of a place based on check-in location data associated with the place.

FIG. 2 illustrates an example method of determining a location and a perimeter of a place based on check-in location data associated with the place. The example method of FIG. 2 can be implemented by a server-side process hosted by one or more computing devices of the social-networking system. In particular embodiments, the server-side process may access data for a plurality of check-in locations associated with the place (201). In particular embodiments, the server-side process may access data stores 101 for a concept node corresponding to the place. The server-side process may identify a plurality of edges stored in data stores 101, each edge connecting the concept node of the place and a user node of a user, and indicating a check-in activity of the user at the place. That is, the server-side process may access data for check-in locations associated with the place by accessing data stored with check-in edges connecting user nodes and the place's concept nodes. In particular embodiments, an edge indicating a check-in activity of a user may comprise data including a geographic location in longitude and latitude coordinates corresponding to a location of the check-in activity, and a time stamp corresponding to the time of the check-in activity. An edge indicating a check-in activity of a user may also comprise data related to the check-in activity. For example, an application hosted by a user's GPS-equipped cellular device may transmit the user's check-in request to a place, including a location in GPS coordinates, an accuracy (e.g. in meters) in the GPS coordinates, and carrier reliability, causing the social-networking system to create and store in data stores 101 an edge connecting a user node of the user and a concept node of the place, while the edge comprises data including a time stamp, the GPS coordinates, the accuracy in the GPS coordinates, and the carrier reliability.

In particular embodiments, the server-side process may calculate a first mean of the plurality of check-in locations (202). In particular embodiments, the server-side process may calculate a first mean of the check-in locations by weighting one or more of the check-in locations based on their recency. For example, the server-side process can weight the check-in locations using an exponential decay function with a half-life of 30 days. For example, the server-side process can include only check-in locations with time stamps within a pre-determined period of time (e.g. within the past two months) in calculating a first mean—e.g. check-in locations within the pre-determined period of time are weighted by 1.0 and other check-in locations are weighted by 0.0. In particular embodiments, the server-side process may calculate a first mean of the check-in locations by weighting one or more of the check-in locations based on their accuracy. For example, the server-side process can include only check-in locations with GPS positioning accuracy within a pre-determined distance (e.g. within 250 meters). In particular embodiments, the server-side process may calculate a first mean of the check-in locations by weighting one or more check-in locations based on their carrier reliability. In one embodiment, the server-side process may not calculate a first mean of the check-in locations associated with the place if the place has less than a pre-determined number (e.g. 20) of check-in activities.

In particular embodiments, the server-side process may calculate a first mean of the check-in locations by weighting one or more check-in locations based on their trustworthiness. For example, the server-side process may include in calculating a first mean only check-in locations associated with users with a high trustworthiness score. The social-networking system may determine a level of trustworthiness of a user based on the user's current and past actions. For example, the social-networking system may determine a user having a high trustworthiness score if the user had created may places in the past and none of those places had been flagged as inappropriate (e.g. spam, offensive, etc.). The social-networking system may determine a user's trustworthiness score based at least in part on indications of whether the user's actions are attributable to human users or internet bots. An example process of determining the level of trustworthiness of a user based on user actions is described more generally in U.S. patent application Ser. No. 11/701,744 filed 2 Feb. 2007, which is hereby incorporated by reference in its entirety and for all purposes.

In calculating a first mean of the check-in locations, the server-side process may project two-dimensional geographic coordinates (e.g. in longitude and latitude) of the check-in locations into a three-dimensional sphere, since the earth has a spherical surface, not a flat surface. The server-side process may calculate a mean in each dimension of the three-dimensional sphere, and calculate the first mean by projecting the calculated mean back to two-dimensional surface.

In particular embodiments, the server-side process may select a subset of the check-in locations based on distances between the first mean and the check-in locations (203). For example, the server-side process can select check-in locations that are within a pre-determined distance (e.g. 5 kilometers) from the first mean. That is, the outliers (e.g. check-in locations that are more than 5 kilometers away from the first mean) are not selected for further processing. The server-side process may calculate a great-circle distance in determining a distance between the first mean and a check-in location.

In particular embodiments, the server-side process may determine a central location and at least a portion of a perimeter of the place based on the subset of the check-in locations (204). In particular embodiments, the place may be represented by a circle with a radius and a center. In particular embodiments, the server-side process may determine a center of a place by calculating a mean of the subset of the check-in locations. The server-side process may calculate a mean of the subset of the check-in locations by weighting the subset of the check-in locations based on their recency, accuracy, trustworthiness, or carrier reliability, as described earlier. The server-side process may calculate a mean of the subset of the check-in locations by projecting two-dimensional geographic coordinates (e.g. in longitude and latitude) into a three-dimensional sphere, calculating a mean in each dimension of the three-dimensional sphere, and project the calculated mean back to two-dimensional surface, as described earlier.

In particular embodiments, the server-side process may determine a radius (from the center) that includes a majority of the subset of the check-in locations. For example, the server-side process may calculate a distance between the center and each of the subset of the check-in locations (e.g. by using great-circle distances as described earlier). The server-side process may bucket the subset of the check-in locations into percentile buckets (e.g. every 10%) based on their distances from the center. The server-side process may construct a cumulative distribution function from the percentile buckets and determine a radius as a knee in the cumulative distribution function. In some embodiments, the server-side process may include the first 30% (30% of the subset of the check-in locations that are closest to the center) and exclude the last 10% (10% of the subset of the check-in locations that are furthest away from the center) when constructing a cumulative distribution function. For example, a knee in the cumulative distribution function can be a distance corresponding to a percentile bucket that has an absolute derivative change greater than a pre-determined threshold (e.g. 0.5). In some embodiments, the server-side process may ignore the pre-determined threshold for a particular percentile bucket if the particular percentile bucket has density larger than a per-determined value (e.g. 300 check-in's in one meter). In other embodiments, the server-side process may determine a radius as a distance of a particular percentile bucket in the cumulative distribution function that has a density falling below a pre-determined value (e.g. 2 check-in's in one meter). In one embodiment, the server-side process may determine a radius as a minimum between a first distance corresponding to a percentile bucket that has an absolute derivative change greater than a pre-determined threshold and a second distance of a percentile bucket in the cumulative distribution function that has a density falling below a pre-determined value.

In other embodiments, the place may be represented by an area with a non-circular or non-symmetrical perimeter. For example, a place corresponding to a city can have an arbitrary-shaped area. The server-side process may determining a perimeter of an area enclosing all check-in locations by constructing a minimum convex hull enclosing all the check-in locations. Particular embodiments contemplate all suitable methods of constructing a perimeter or an area to include all or some of the check-in locations. Furthermore, the server-side process may construct a smaller minimum convex hull by removing a percentile bucket (e.g. 10%) of check-in locations that are closeted to the hull's perimeter. By successively removing a percentile bucket of check-in locations and construct a smaller minimum convex hull, the server-side process may construct a cumulative distribution function based on the percentile buckets, and may determine an area (and a perimeter) of the place as a particular minimum convex hull that corresponds to a knee of the cumulative distribution function. That is, the particular minimum convex hull can have a much larger area while adding the percentile bucket of check-in points immediately outside the particular minimum convex hull, and can have little change in its area while removing the percentile bucket of check-in points immediately inside the particular minimum convex hull. The server-side process may determine a central location of the place as a centroid of an area of the particular minimum convex hull.

In particular embodiments, the server-side process may store the central location and the perimeter of the place in data stores 101. For example, the server-side process may store the central location and the perimeter in the place's concept node stored in data stores 101. The server-side process may periodically (e.g. every 24 hours) update a place's central location and perimeter stored in data stores 101. The server-side process may not update a place's central location and perimeter stored in data stores 101 if a newly calculated central location and perimeter (e.g. a radius) has not changed for more than a pre-determined threshold (e.g. 10%, or 25 meters). The server-side process may not update a place's central location and perimeter stored in data stores 101 if a newly calculated central location and perimeter (e.g. a radius) has changed significantly (e.g. more than 1 kilometers). In one embodiment, the server-side process may only store a central location of a place in data stores 101 if a calculated perimeter of the place is less than a pre-determined threshold (e.g. 25 meters).

Particular embodiments may repeat the steps of the method of FIG. 2, where appropriate. Moreover, although this disclosure describes and illustrates particular steps of the method of FIG. 2 as occurring in a particular order, this disclosure contemplates any suitable steps of the method of FIG. 2 occurring in any suitable order. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
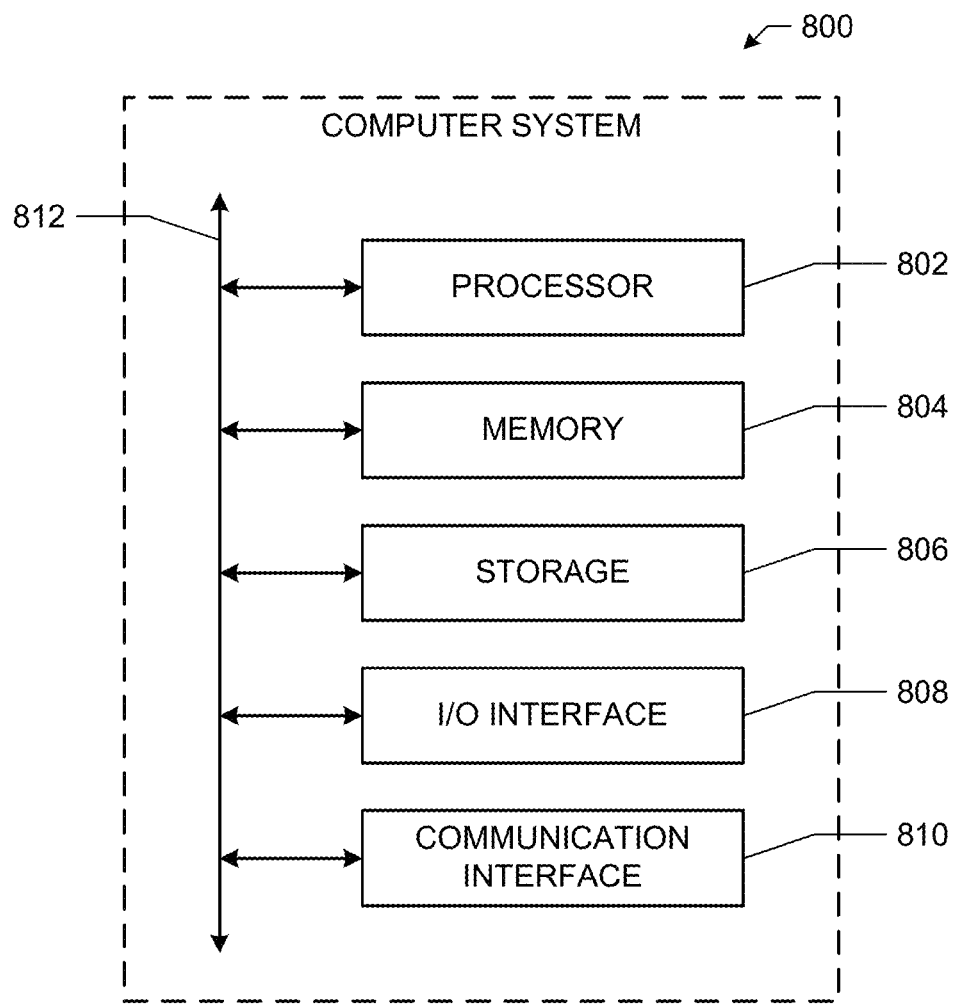
FIG. 3 illustrates an example computer system.

FIG. 3 illustrates an example computer system 800, which may be used with some embodiments of the present invention. This disclosure contemplates any suitable number of computer systems 800. This disclosure contemplates computer system 800 taking any suitable physical form. As example and not by way of limitation, computer system 800 may be an embedded computer system, a system-on-chip (SOC), a desktop computer system, a mobile computer system, a game console, a mainframe, a mesh of computer systems, a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. In particular embodiments, memory 804 includes main memory for storing instructions for processor 802 to execute or data for processor 802 to operate on. As an example and not by way of limitation, computer system 800 may load instructions from storage 806 to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM).

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), or flash memory or a combination of two or more of these.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (e.g. a BLUETOOTH WPAN), a WI-FI network (e.g. a 802.11a/b/g/n WI-FI network,), a WI-MAX network, a cellular network (e.g. a Global System for Mobile Communications (GSM) network, a Long Term Evolution (LTE) network), or other suitable wireless network or a combination of two or more of these.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, or another suitable bus or a combination of two or more of these. Bus 812 may include one or more buses 812, where appropriate.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system r a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:
   accessing a social graph comprising a plurality of nodes and a plurality of edges connecting the nodes, each of the edges between two of the nodes representing a single degree of separation between them, the nodes comprising:
      a plurality of user nodes corresponding to a plurality of users of an online social network; and
      a plurality of concept nodes corresponding to a plurality of places;
   accessing geographic location data for a plurality of check-in locations associated with a place, wherein each of the check-in locations corresponds to an edge of the social graph corresponding to a check-in activity between a user node of a user and a concept node of the place;
   calculating a first mean of the plurality of check-in locations;
   selecting a subset of the check-in locations based on distances between the first mean and the check-in locations; and
   determining a central location and at least a portion of a perimeter of the place based on the subset of the check-in locations.

2. The method of claim 1, wherein calculating the first mean comprises weighting one or more of the check-in locations based on their recency, accuracy, trustworthiness, or carrier reliability.

3. The method of claim 2, wherein the weighting of one or more of the check-in locations comprises an exponential decay function.

4. The method of claim 1, wherein a check-in location comprises a geographic location of a check-in by a user of a social-networking system.

5. The method of claim 1, wherein the central location is a center or a centroid.

6. The method of claim 1, wherein calculating the first mean comprises:

projecting two-dimensional geographic coordinates of the check-in locations onto a three-dimensional sphere;

calculating a second mean in each dimension of the three-dimensional sphere; and calculating the first mean by projecting the one or more of the second means onto a two-dimensional surface.

7. The method of claim 1, wherein the distances between the first mean and the check-in locations are calculated using great-circle distances.

8. The method of claim 1, wherein determining the central location and at least the portion of the perimeter comprises:

constructing a cumulative distribution function for the subset of the check-in locations with weighted percentile buckets in distances from the central location; and determining the perimeter based at least in part on one or more characteristics of the cumulative distribution function.

9. The method of claim 1, wherein, for each of one or more of the check-in locations, the place associated with the check-in location was selected by a user from a plurality of places presented to the user based on a determined geographic location of the user.

10. One or more computer-readable non-transitory storage media embodying software that is operable when executed to:

access a social graph comprising a plurality of nodes and a plurality of edges connecting the nodes, each of the edges between two of the nodes representing a single degree of separation between them, the nodes comprising:
  a plurality of user nodes corresponding to a plurality of users of an online social network; and
  a plurality of concept nodes corresponding to a plurality of places;

access geographic location data for a plurality of check-in locations associated with a place, wherein each of the check-in locations corresponds to an edge of the social graph corresponding to a check-in activity between a user node of a user and a concept node of the place;

calculate a first mean of the plurality of check-in locations;

select a subset of the check-in locations based on distances between the first mean and the check-in locations; and determine a central location and at least a portion of a perimeter of the place based on the subset of the check-in locations.

11. The non-transitory storage media of claim 10, wherein to calculate the first mean, the software is operable when executed to weight one or more of the check-in locations based on their recency, accuracy, trustworthiness, or carrier reliability.

12. The non-transitory storage media of claim 11, wherein the weighting of one or more of the check-in locations comprises an exponential decay function.

13. The non-transitory storage media of claim 10, wherein a check-in location comprises a geographic location of a check-in by a user of a social-networking system.

14. The non-transitory storage media of claim 10, wherein the central location is a center or a centroid.

15. The non-transitory storage media of claim 10, wherein to calculate the first mean, the software is operable when executed to:

project two-dimensional geographic coordinates of the check-in locations onto a three-dimensional sphere;

calculate a second mean in each dimension of the three-dimensional sphere; and calculate the first mean by projecting the one or more of the second means onto a two-dimensional surface.

16. The non-transitory storage media of claim 10, wherein the distances between the first mean and the check-in locations are calculated using great-circle distances.

17. The non-transitory storage media of claim 10, wherein to determine the central location and at least the portion of the perimeter, the software is operable when executed to:

construct a cumulative distribution function for the subset of the check-in locations with weighted percentile buckets in distances from the central location; and determine the perimeter based at least in part on one or more characteristics of the cumulative distribution function.

18. The non-transitory storage media of claim 10, wherein, for each of one or more of the check-in locations, the place associated with the check-in location was selected by a user from a plurality of places presented to the user based on a determined geographic location of the user.

19. An apparatus comprising:

one or more processors; and one or more computer-readable non-transitory storage media embodying instructions operable, when executed by the processors, to cause the processors to:

access a social graph comprising a plurality of nodes and a plurality of edges connecting the nodes, each of the edges between two of the nodes representing a single degree of separation between them, the nodes comprising:
  a plurality of user nodes corresponding to a plurality of users of an online social network; and
  a plurality of concept nodes corresponding to a plurality of places;

access geographic location data for a plurality of check-in locations associated with a place, wherein each of the check-in locations corresponds to an edge of the social graph corresponding to a check-in activity between a user node of a user and a concept node of the place;

calculate a first mean of the plurality of check-in locations;

select a subset of the check-in locations based on distances between the first mean and the check-in locations; and determine a central location and at least a portion of a perimeter of the place based on the subset of the check-in locations.

20. The apparatus of claim 19, wherein to calculate the first mean, the instructions are operable, when executed by the processors, to cause the processors to weight one or more of the check-in locations based on their recency, accuracy, trustworthiness, or carrier reliability.

21. The apparatus of claim 19, wherein the weighting of one or more of the check-in locations comprises an exponential decay function.

22. The apparatus of claim 19, wherein a check-in location comprises a geographic location of a check-in by a user of a social-networking system.

23. The apparatus of claim 19, wherein, for each of one or more of the check-in locations, the place associated with the check-in location was selected by a user from a plurality of places presented to the user based on a determined geographic location of the user.

* * * * *